(12) United States Patent
Qu et al.

(10) Patent No.: US 12,212,038 B2
(45) Date of Patent: Jan. 28, 2025

(54) ELECTRONIC DEVICE

(71) Applicant: HONOR DEVICE CO., LTD., Shenzhen (CN)

(72) Inventors: Kai Qu, Shenzhen (CN); Lijun Yang, Shenzhen (CN); Baojun Gao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/023,877

(22) PCT Filed: Aug. 25, 2022

(86) PCT No.: PCT/CN2022/114777
§ 371 (c)(1),
(2) Date: Feb. 28, 2023

(87) PCT Pub. No.: WO2023/035962
PCT Pub. Date: Mar. 16, 2023

(65) Prior Publication Data
US 2024/0178545 A1    May 30, 2024

(30) Foreign Application Priority Data
Sep. 7, 2021 (CN) .......................... 202111045127.1

(51) Int. Cl.
*H01Q 1/22* (2006.01)
(52) U.S. Cl.
CPC .................................... *H01Q 1/22* (2013.01)
(58) Field of Classification Search
None
See application file for complete search history.

(56) References Cited

U.S. PATENT DOCUMENTS

| | | | |
|---|---|---|---|
| 10,729,036 | B2 | 7/2020 | Jin et al. |
| 2002/0151328 | A1 | 10/2002 | Shin et al. |

(Continued)

FOREIGN PATENT DOCUMENTS

| | | |
|---|---|---|
| CN | 202616397 U | 12/2012 |
| CN | 204090364 U | 1/2015 |

(Continued)

OTHER PUBLICATIONS

Jiangbo Duan;"Research on New System Terminal MIMO Antenna and High Scanning rate Leaky Wave Antenna";Hangzhou Dianzi University;Dissertation for the Master Degree;Feb. 15, 2021;69 pages(with English abstract).

(Continued)

*Primary Examiner* — Wilson Lee
(74) *Attorney, Agent, or Firm* — WOMBLE BOND DICKINSON (US) LLP (57) ABSTRACT

An electronic device includes a middle frame, an antenna board, and a fastener. The middle frame is provided with a mounting cavity, and an inner wall of the mounting cavity is provided with a limiting portion. The antenna board is placed in the mounting cavity, and the fastener is capable of being clamped between the limiting portion and an upper end face of the antenna board, to restrict the antenna board from moving upward along a depth direction of the mounting cavity. This application can resolve a problem of operation inconvenience in antenna board mounting when a mounting space for mounting the antenna board is small, and can further resolve a problem that a peripheral component is easily damaged in a mounting process.

15 Claims, 7 Drawing Sheets

(56) References Cited

U.S. PATENT DOCUMENTS

| | | | |
|---|---|---|---|
| 2009/0067141 A1 | 3/2009 | Dabov et al. | |
| 2009/0231212 A1 | 9/2009 | Hardacker et al. | |
| 2010/0073241 A1 | 3/2010 | Ayala Vazquez et al. | |
| 2011/0031360 A1* | 2/2011 | Pan | H01Q 1/1207 |
| | | | 248/201 |
| 2013/0271337 A1* | 10/2013 | Lee | H01Q 23/00 |
| | | | 343/840 |
| 2014/0132460 A1 | 5/2014 | Cho et al. | |
| 2016/0294022 A1* | 10/2016 | Thramann | B60L 50/64 |
| 2018/0323490 A1* | 11/2018 | Harp | H01Q 1/405 |
| 2020/0220247 A1* | 7/2020 | Lin | H01Q 1/1207 |
| 2021/0175606 A1 | 6/2021 | Ramasamy et al. | |

FOREIGN PATENT DOCUMENTS

| | | |
|---|---|---|
| CN | 205104599 U | 3/2016 |
| CN | 206472427 U | 9/2017 |
| CN | 107689483 A | 2/2018 |
| CN | 107995333 A | 5/2018 |
| CN | 108039556 A | 5/2018 |
| CN | 108039565 A | 5/2018 |
| CN | 108336475 A | 7/2018 |
| CN | 108541132 A | 9/2018 |
| CN | 108682937 A | 10/2018 |
| CN | 109546295 A | 3/2019 |
| CN | 112291154 A | 1/2021 |
| CN | 112421209 A | 2/2021 |
| CN | 113178681 A | 7/2021 |
| JP | 2012109670 A | 6/2012 |
| WO | 2021103911 A1 | 6/2021 |

OTHER PUBLICATIONS

Yan Yi;"Design and Research of Terminal Antennas Based on The Characteristic Mode";University of Electronic Science and Technology of China;Dissertation for the Master Degree;Aug. 28, 2020;164 pages(with English abstract).

Shengjie Wu;"Dual-Polarized Ring-Slot 5G Millimeter-Wave Antenna and Array Based on Metal Frame for Mobile Phone Applications";2019 13th European Conference on Antennas and Propagation; Jun. 20, 2019.

* cited by examiner

ELECTRONIC DEVICE

CROSS-REFERENCE TO RELATED APPLICATIONS

This application is a national stage of International Application No. PCT/CN2022/114777, filed on Aug. 25, 2022, which claims priority to Chinese Patent Application No. 202111045127.1, filed on Sep. 7, 2021. The disclosures of both of the aforementioned application are hereby incorporated by reference in their entireties.

TECHNICAL FIELD

Embodiments of this application relate to the field of electronic product technologies, and in particular, to an electronic device.

BACKGROUND

In electronic devices such as mobile phones, a sidewall of a middle frame is provided with a mounting cavity for mounting an antenna board. The mounting cavity is located outside a battery compartment. As the electronic devices are provided with increasing functions and larger screens, the electronic devices consume power faster. To ensure a battery life for the electronic devices, a larger battery is preferred. Correspondingly, a larger space is also preferred for the battery compartment. Therefore, when the electronic devices have a same volume, the middle frame is located in a limited space outside the battery compartment, and a space of the mounting cavity is limited. As a result, when the antenna board is mounted in the mounting cavity, an operation space is limited.

In a conventional technology, the antenna board is fastened in the mounting cavity by using screws, the space of the mounting cavity is small, fastening by screws is inconvenient, and the middle frame and even the battery compartment are easily damaged during a mounting process.

SUMMARY

Embodiments of this application provide an electronic device, to resolve a problem of operation inconvenience in antenna board mounting when a mounting space for mounting an antenna board is small, and a problem that a peripheral component is easily damaged in a mounting process.

In one aspect, an embodiment of this application provides an electronic device, including a middle frame, an antenna board, and a fastener. The middle frame is provided with a mounting cavity, and an inner wall of the mounting cavity is provided with a limiting portion. The antenna board is placed in the mounting cavity, and the fastener is capable of being clamped between the limiting portion and an upper end face of the antenna board, to restrict the antenna board from moving upward along a depth direction of the mounting cavity.

The antenna board mounted in the mounting cavity can be fastened by using the fastener and the limiting portion. The limiting portion is integrally formed on the inner wall of the mounting cavity. During specific mounting, after the antenna board is mounted in the mounting cavity, it is only required to insert the fastener between the limiting portion and the antenna board, without using a large complex operation tool (such as a screwdriver). The mounting operation can be simplified, and no damage is caused to the inner wall of the mounting cavity and even an adjacent battery compartment.

According to the aspect, this embodiment of this application further provides a first implementation of the aspect:

the mounting cavity is inwardly provided with a limiting protrusion on each of two sidewalls along a width direction, a spacing between the limiting protrusions disposed on the two sidewalls is less than a width of the fastener, and the limiting protrusions form the limiting portion. The two limiting protrusions are used to limit the antenna board from two sides along the width direction. This can ensure stability, so that a more balanced acting force is applied to the fastener and the limiting is more stable.

According to the aspect, this embodiment of this application further provides a second implementation of the aspect:

the limiting portion is a limiting groove disposed on the inner wall of the mounting cavity, and the fastener is capable of being inserted into the limiting groove and abutting against the upper end face of the antenna board. The limiting groove is used to limit the fastener, and the limiting groove does not occupy a space in the mounting cavity, to facilitate the mounting operation of the antenna board.

According to the aspect or the first or second implementation of the aspect, this embodiment of this application further provides a third implementation of the aspect:

a slot is further disposed on an inner wall at one end of the mounting cavity along a length direction of the mounting cavity, a first end of the antenna board along a length direction of the antenna board is capable of being inserted into the slot, and an upper sidewall of the slot is capable of restricting the antenna board from moving upward. When the fastener and the slot are used to limit the antenna board, only one fastener needs to be disposed to ensure mounting stability of the antenna board and to further simplify an overall structure while simplifying the mounting operation.

According to the third implementation of the aspect, this embodiment of this application further provides a fourth implementation of the aspect:

the mounting cavity includes an upper cavity body and a middle cavity body from top to bottom; and the middle cavity body is provided with the slot, and the upper cavity body outwardly extends away from one end of the slot and forms an avoidance space. Disposing the avoidance space facilitates the mounting operation of the antenna board.

According to the fourth implementation of the aspect, this embodiment of this application further provides a fifth implementation of the aspect:

a bottom of the middle cavity body is further provided with an accommodating groove, a lower end face of the antenna board is further provided with a metal elastomer for connecting to the middle frame, and when the antenna board is mounted in the middle cavity body, the metal elastomer is located in the accommodating groove. In a mounting state, the fastener and the metal elastomer can respectively act on the antenna board from the end faces on upper and lower sides, so that a location of the antenna board is stable. In addition, as the metal elastomer can provide an elastic acting force to the antenna board, a case of crushing the antenna board is avoided while stability is ensured, and further precision requirements on the limiting portion and the fastener can be reduced.

According to any one of the aspect and the first to the fifth implementations of the aspect, this embodiment of this application further provides a sixth implementation of the aspect:

the fastener is provided with a first limiting structure, the antenna board is provided with a second limiting structure, and when the fastener abuts against the upper end face of the antenna board, the first limiting structure and the second limiting structure are capable of cooperating with each other to restrict the fastener from moving and being detached from the limiting portion. With this arrangement, after the mounting is completed, a case that is caused by shaking of the electronic device and the like and in which the fastener slides relative to the limiting portion along the length direction of the mounting cavity and is detached from the limiting portion can be avoided in a use process. This can ensure that the fastener can be stably clamped between the limiting portion and the upper end face of the antenna board, and further ensure that the fastener has a stable effect on the antenna board.

According to the sixth implementation of the aspect, this embodiment of this application further provides a seventh implementation of the aspect:

the first limiting structure is a first convex portion upwardly protruding from the fastener, the second limiting structure is a second convex portion upwardly protruding from the upper end face of the antenna board, and the first convex portion is located between the second convex portion and the limiting portion. With this arrangement, the first convex portion can be restricted from moving to both sides along the length direction, thereby ensuring limiting stability.

According to the seventh implementation of the aspect, this embodiment of this application further provides an eighth implementation of the aspect:

the fastener includes a fastening plate, and the fastening plate partially arches upward and forms the first convex portion. When the first convex portion is formed by the partial arching, the overall structure can be simplified and an overall weight can be reduced.

According to the eighth implementation of the aspect, this embodiment of this application further provides a ninth implementation of the aspect:

an end of the first convex portion is further provided with a stopper for abutting against the second convex portion, a bottom of the stopper is capable of abutting against the upper end face of the antenna board, and a limiting block is further disposed on a side that is of an upper portion of the stopper and that faces the second convex portion. This avoids a limiting failure caused by entry of the second convex portion into a gap in a case that the second convex portion abuts against the stopper. In addition, when the second convex portion abuts against the stopper, the limiting block can limit an abutment location of the second convex portion from above, so as to limit the second convex portion to between the upper end face of the antenna board and the limiting block, thereby ensuring a stable limiting effect.

According to any one of the seventh to ninth implementations of the aspect, this embodiment of this application further provides a tenth implementation of the aspect:

the upper end face of the antenna board is fixedly provided with a baffle plate, and the baffle plate is upwardly bent towards one end of the first convex portion and forms the second convex portion. With this arrangement, a case in which the second convex portion enters a gap between a lower end of the stopper and the upper end face of the antenna board can be avoided. In addition, when the second convex portion is formed by bending the baffle plate, the overall structure and a molding process can be further simplified.

According to the sixth implementation of the aspect, this embodiment of this application further provides an eleventh implementation of the aspect:

one of the first limiting structure and the second limiting structure is a positioning hole and the other is a positioning protrusion, and when the fastener is clamped between the limiting portion and the upper end face of the antenna board, the positioning protrusion is capable of being inserted into the positioning hole. When the positioning hole cooperates with the positioning protrusion to implement positioning, the overall structure can be simplified while a stable limiting effect can be ensured.

According to any one of the aspect and the first to the eleventh implementations of the aspect, this embodiment of this application further provides a twelfth implementation of the aspect:

the fastener is further provided with an operation portion to facilitate the mounting operation.

According to the twelfth implementation of the aspect, this embodiment of this application further provides a thirteenth implementation of the aspect:

the operation portion is capable of being detached from the fastener. No external auxiliary tool is required during mounting, the mounting is convenient, and impact of the operation portion on subsequent mounting or a peripheral structure can be avoided.

According to the twelfth implementation of the aspect, this embodiment of this application further provides a fourteenth implementation of the aspect:

the operation portion is formed by bending an end of the fastener, and the operation portion is located in the mounting cavity. This can facilitate the mounting operation, and can avoid impact of the operation portion on subsequent mounting or a peripheral structure.

BRIEF DESCRIPTION OF DRAWINGS

To describe technical solutions in embodiments of the present invention or in a conventional technology more clearly, the following briefly describes accompanying drawings required for describing the embodiments or the conventional technology. Apparently, the accompanying drawings in the following description show some embodiments of the present invention, and a person of ordinary skill in the art may still derive other drawings from these accompanying drawings without creative efforts.

FIG. 6 to FIG. 9 are diagrams of processes of mounting an antenna board and a fastener, where

DESCRIPTION OF REFERENCE NUMERALS
IN FIG. 1 TO FIG. 11

1: middle frame; 11: mounting cavity; 111: upper cavity body; 112: middle cavity body; 113: accommodating groove; 114: slot; 115: limiting protrusion; 116: avoidance space; 12: middle plate; and 13: bezel;
2: antenna board; 21: first end; 22: second end; 23: second convex portion; and 24: baffle plate;
3: fastener; 31: fastening plate; 311: guiding surface; 32: first convex portion; 33: stopper; and 34: limiting block;
4: metal elastomer;
51: positioning hole; and 52: positioning protrusion;
6: operation portion; and
7: battery compartment.

DESCRIPTION OF EMBODIMENTS

Embodiments of the present invention provide an electronic device. The electronic device may be a terminal product, such as a mobile phone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in the embodiments of this application.

Figure 1:
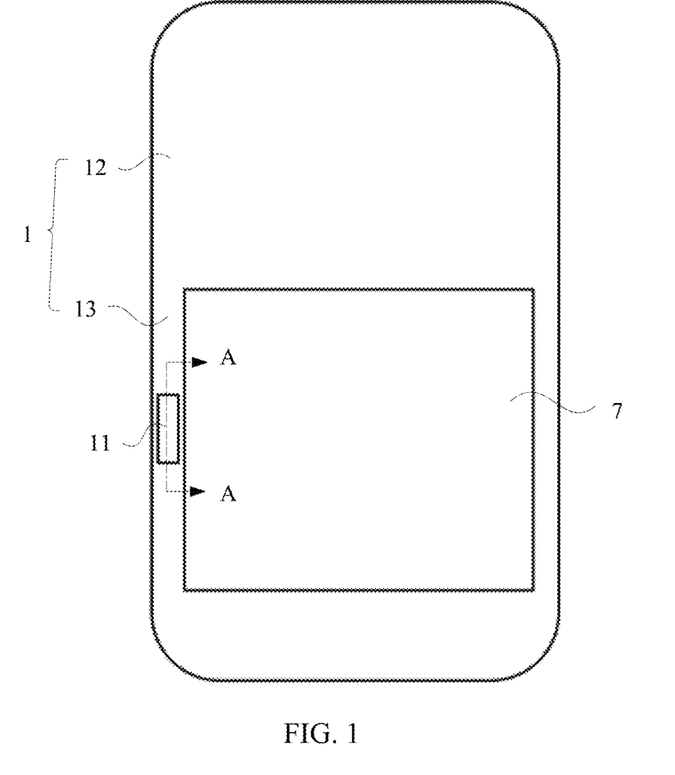
FIG. 1 is a schematic diagram of a structure of a middle frame of an electronic device according to an embodiment of this application.

The electronic device includes a screen, a rear cover, and a middle frame. The middle frame is located between the screen and the rear cover. As shown in FIG. 1, a middle frame 1 of the electronic device includes a middle plate 12 and a bezel 13. The bezel 13 circumferentially surrounds an outer edge of the middle plate 12. A battery compartment 7 is provided between the middle plate 12 and the rear cover. The battery compartment 7 is configured to house a battery for supplying power to the electronic device. The bezel 13 is provided with a mounting cavity 11. A depth direction of the mounting cavity 11 is arranged along a thickness direction of the electronic device. The mounting cavity 11 is provided on an end face on a rear side of the middle frame 1 ("rear side" specifically refers to a side facing the rear cover). The mounting cavity 11 is located outside the battery compartment 7 and is configured to mount an antenna board 2 of the electronic device.

As electronic devices are provided with increasing functions and larger screens, the electronic devices consume power faster. To ensure a battery life for the electronic devices, a larger battery is preferred. Correspondingly, a larger space is also preferred for the battery compartment 7. Therefore, when the electronic devices have a same volume, the middle frame 1 is located in a limited space outside the battery compartment 7, that is, the bezel 13 has a limited width, and an arrangement space of the mounting cavity 11 is limited. As a result, when the antenna board 2 is mounted in the mounting cavity 11, an operation space is limited, and a mounting operation is inconvenient. Therefore, in the embodiments of this application, the antenna board 2 is fastened in the mounting cavity 11 by using a fastener 3. This can ensure mounting stability of the antenna board 2 while simplifying the mounting operation, and can further avoid damage to the middle frame 1 and the battery compartment 7 in a mounting process.

Figure 2:
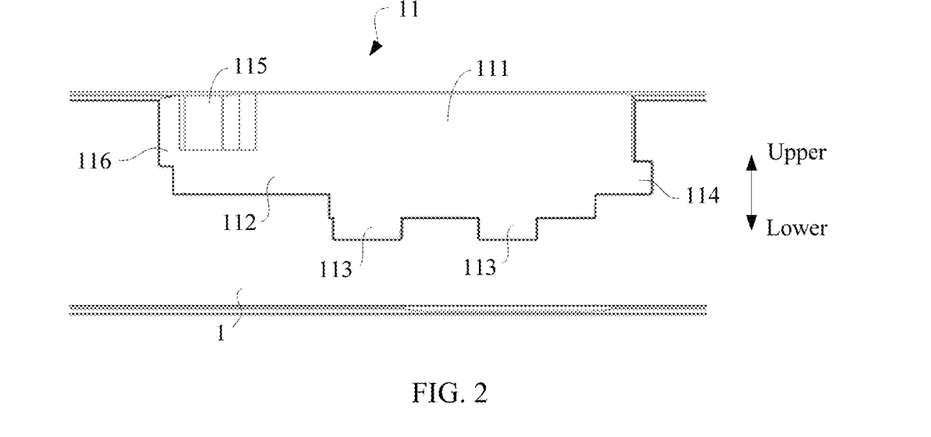
FIG. 2 is a cutaway drawing along A-A in FIG. 1.

In the embodiments of this application, as shown in FIG. 2, "upper" refers to a side facing an opening along the depth direction of the mounting cavity 11, and correspondingly "lower" refers to a side facing the inside of the mounting cavity 11 along the depth direction of the mounting cavity 11.

Figure 3:
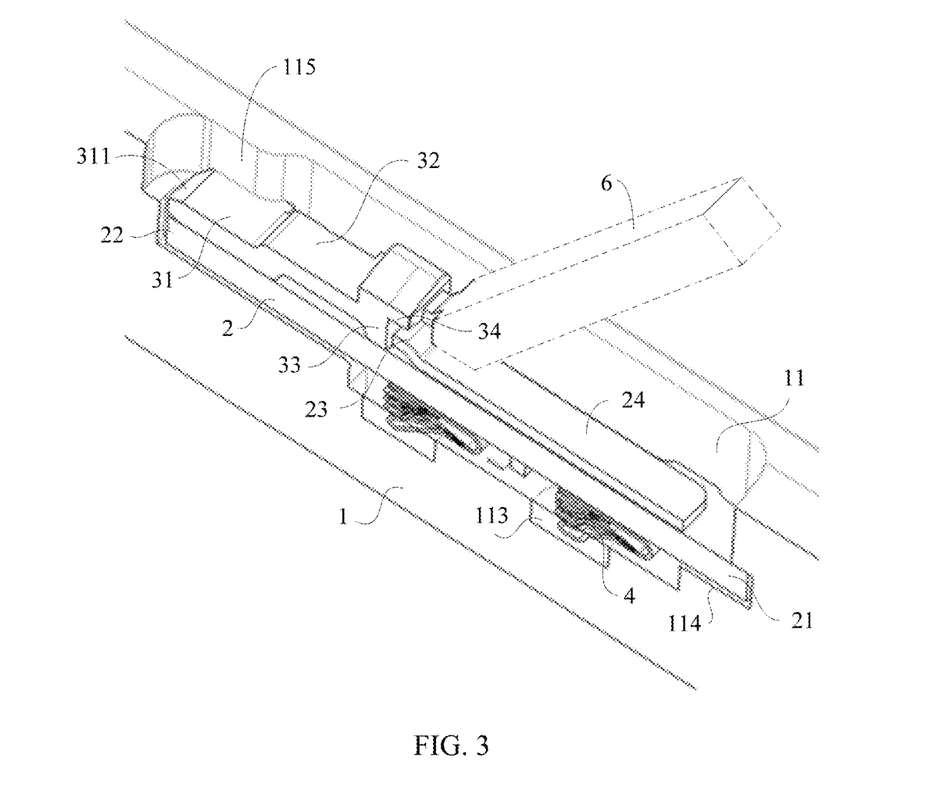
FIG. 3 is a schematic diagram of a structure of a mounting cavity in which an antenna board has been mounted, where an operation portion can be detached from a fastener.

As shown in FIG. 2 and FIG. 3, inner walls of the mounting cavity 11 each are provided with a limiting protrusion 115. Two opposite sidewalls of the mounting cavity 11 along a width direction inwardly protrude to form the limiting protrusions 115, respectively. A spacing between the limiting protrusions 115 provided on the two sidewalls is less than a width of the fastener 3 and greater than a width of the antenna board 2 that corresponds to a location here. The fastener 3 can be clamped between an upper end face of the antenna board 2 and the limiting protrusions 115. In this case, the limiting protrusions 115 are located above the fastener 3 and restrict the fastener 3 from moving upward, and the limiting protrusions 115 form a limiting portion for restricting the fastener 3 from moving upward.

During mounting, the antenna board 2 can directly pass through a gap between the two limiting protrusions 115 and enter a mounting groove. Then, the fastener 3 is inserted against the upper end face of the antenna board 2 between the upper end face of the antenna board 2 and the limiting protrusions 115. The operations are convenient. The limiting protrusions 115 are used to limit the antenna board 2 from two sides along the width direction. This can ensure stability, so that a more balanced acting force is applied to the fastener 3 and the limiting is more stable.

Specific locations for disposing the limiting protrusions 115 are not limited. As shown in FIG. 2, the limiting protrusions 115 are located at one end of the mounting cavity 11, or the limiting protrusions 115 may be disposed at middle locations in a length direction of the mounting cavity 11. This is not specifically limited.

Surfaces of the limiting protrusions 115 present smooth structures, to avoid damage to the antenna board 2 caused by scraping the antenna board 2 during mounting. Further, an end of the fastener 3 is further provided with a guiding surface 311. When the fastener 3 is mounted, the fastener 3 is inserted between the upper end face of the antenna board 2 and the limiting protrusions 115. The guiding surface 311 can avoid abrasion during insertion. The guiding surface 311 may be either an arc surface or an inclined surface.

Certainly, in some embodiments, a limiting groove (not shown in the figure) may be further provided on an inner wall of the mounting cavity, to form the limiting portion for restricting the fastener 3 from moving upward. After the antenna board 2 is mounted in the mounting cavity 11, the fastener 3 is inserted into the limiting groove. In this case, the fastener 3 can abut against the upper end face of the antenna board 2, and an upper groove wall of the limiting groove can restrict the fastener 3 from moving upward, thereby ensuring location stability of the antenna board 2. Specifically, the limiting groove may be disposed on each of the two sidewalls of the mounting cavity 11 along the width direction, or may be disposed on an inner wall at one end of the mounting cavity 11. The limiting groove is used to limit the fastener 3, and the limiting groove does not occupy a space in the mounting cavity 11, to facilitate the mounting operation of the antenna board 2.

As shown in FIG. 2 and FIG. 3, a slot 114 is further disposed on an inner wall of the mounting cavity 11. The slot 114 is disposed at one end of the mounting cavity 11. The antenna board 2 is a strip-shaped structure. Two ends of the antenna board 2 along its length direction are respectively a first end 21 and a second end 22. During mounting, the first end 21 can be inserted into the slot 114, and an upper sidewall of the slot 114 can limit the first end 21, to prevent the first end 21 from moving upward along the depth direction of the mounting cavity 11. The fastener 3 can be clamped between the upper end face of the antenna board 2 and the limiting protrusions 115. In this case, the limiting protrusions 115 are located above the fastener 3 and restrict the fastener 3 from moving upward, and the fastener 3 restricts the antenna board 2 from moving upward. The antenna board 2 is limited by using both the slot 114 and the fastener 3, to prevent the antenna board 2 from moving upward, and further ensure that the antenna board 2 is stably located in the mounting cavity 11.

As shown in FIG. 3, a lower end face of the antenna board 2 is further provided with a metal elastomer 4. The metal elastomer 4 can be clamped between the antenna board 2 and the middle frame 1 and is configured to implement electrical connection. A bottom of the mounting cavity 11 is further provided with an accommodating groove 113. After the antenna board 2 is mounted in the mounting cavity 11, the metal elastomer 4 can be located in the accommodating groove 113, the limiting protrusions 115 can be pressed against the antenna board 2 from above, the antenna board 2 downwardly compresses the metal elastomer 4, and the metal elastomer 4 in a compressed state can provide the antenna board 2 with an upward elastic support force. In other words, in a mounting state, the fastener 3 and the metal elastomer 4 can respectively act on the antenna board 2 from the end faces on upper and lower sides, so that a location of the antenna board 2 is stable. In addition, as the metal elastomer 4 can provide an elastic acting force to the antenna board 2, a case of crushing the antenna board 2 is avoided while stability is ensured, and further precision requirements on the limiting protrusions 115 and the fastener 3 can be reduced.

The antenna board 2 mounted in the mounting cavity 11 can be fastened by using the fastener 3 and the limiting protrusions 115. The limiting protrusions 115 are fixedly provided on the inner walls of the mounting cavity 11. The limiting protrusions 115 and the mounting cavity 11 are integrally formed, or may be fastened by soldering or in another manner before factory delivery. During specific mounting, after the antenna board 2 is mounted in the mounting cavity 11, it is only required to insert the fastener 3 between the antenna board 2 and the mounting cavity 11, without using a large complex operation tool (such as a screwdriver). The mounting operation can be simplified, and no damage is caused to the inner walls of the mounting cavity 11 and even the adjacent battery compartment 7. A quantity of the fasteners 3 is not limited. Specifically, the antenna board 2 may be limited by using two fasteners 3, or the antenna board 2 may be limited by using one fastener 3. Specifically, the quantity of the fasteners 3 may be set based on a length of the antenna board, a length of each fastener, and the like.

In the embodiments of this application, alternatively, no slot 114 may be disposed in the mounting cavity 11, and the antenna board 2 may be fastened only by using the fastener 3 and the limiting portion (the limiting protrusions 115 or the limiting groove). When the fastener 3 and the slot 114 are used to limit the antenna board 2, only one fastener 3 needs to be disposed to ensure mounting stability of the antenna board 2 and to further simplify an overall structure while simplifying the mounting operation.

The mounting cavity 11 is inwardly provided with the limiting protrusions 115 respectively on the two opposite sidewalls along the width direction, the spacing between the two limiting protrusions 115 is less than the width of the fastener 3 and greater than the width of the antenna board 2 that corresponds to a location here, thereby forming the limiting portion above. During mounting, the antenna board 2 can directly pass through the gap between the two limiting protrusions 115 and enter the mounting groove. Then, the fastener 3 is inserted against the upper end face of the antenna board 2 between the upper end face of the antenna board 2 and the limiting protrusions 115. The operations are convenient. The limiting protrusions 115 are used to limit the antenna board 2 from the two sides along the width direction. This can ensure stability, so that a more balanced acting force is applied to the fastener 3 and the limiting is more stable.

As shown in FIG. 2, the space in the mounting cavity 11 sequentially includes an upper cavity body 111 and a middle cavity body 112 from outside in. A length of the middle cavity body 112 adapts to the length of the antenna board 2. The middle cavity body 112 is provided with the foregoing slot 114 at one end along its own length direction. The upper cavity body 111 is provided with the limiting protrusions 115. The middle cavity body 112 is configured to accommodate the antenna board 2. The upper cavity body 111 is located above the middle cavity body 112. In addition, the upper cavity body 111 outwardly extends relative to the middle cavity body 112 by one segment at one end away from the slot 114. This extending portion forms an avoidance space. A bottom of the middle cavity body 112 is provided with the accommodating groove 113.

To ensure location stability for the antenna board 2 after the antenna board 2 is mounted in the middle cavity body 112, the length of the middle cavity body 112 is not much greater than the length of the antenna board 2. Therefore, to ensure that the antenna board 2 can be smoothly mounted in the middle cavity body 112 and fit into the slot 114, the antenna board 2 inclinedly enters the mounting cavity 11 during mounting. Specifically, the first end 21 downwardly enters the middle cavity body 112 of the mounting cavity 11 and reaches an opening location of the slot 114. In this case, the second end 22 is inclined upward and located in the avoidance space of the upper cavity body 111, and then the antenna board 2 is pushed, so that the first end 21 is inserted into the slot 114. At this time, the antenna board 2 is still inclined and the second end 22 is located in the upper cavity body 111. Afterwards, the second end 22 is pushed downward, so that the second end 22 fully enters the middle cavity body 112. The metal elastomer 4 on the lower end face of the antenna board 2 can just fall into the accommodating groove 113. Subsequently, the fastener 3 is mounted. Disposing the avoidance space 116 facilitates the mounting operation of the antenna board 2.

Figure 4:
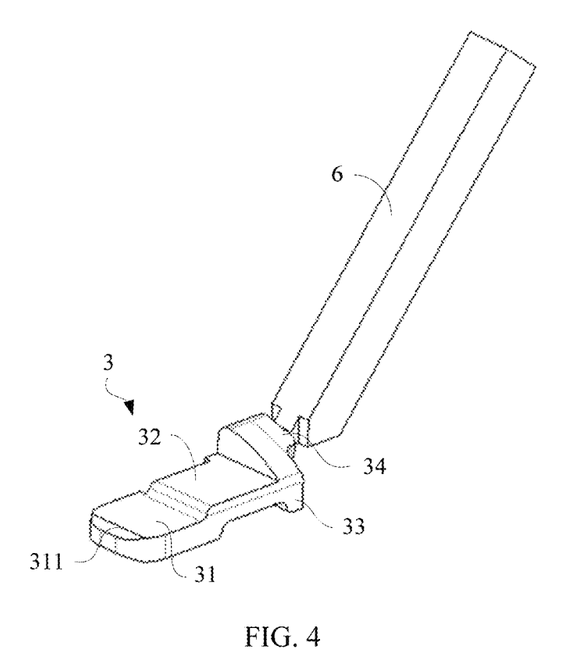
FIG. 4 is a schematic diagram of a structure of the fastener in FIG. 3.
Figure 5:
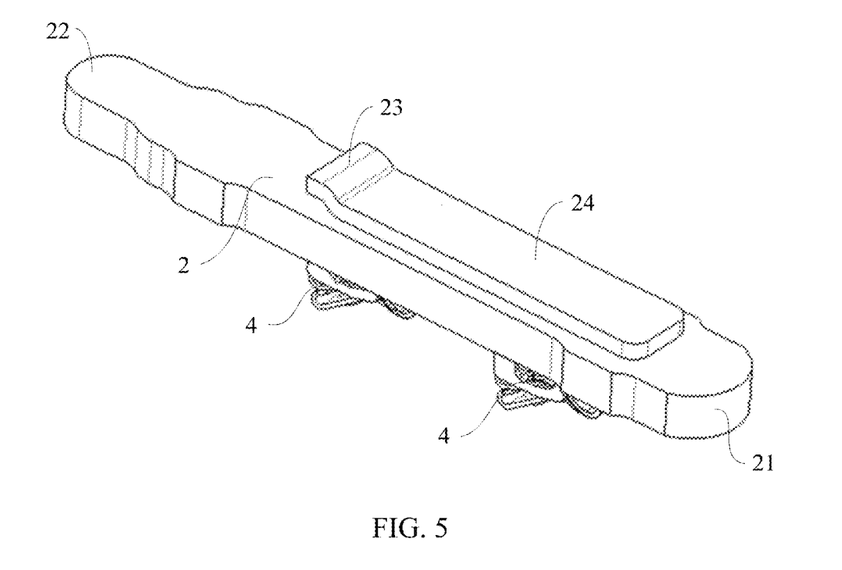
FIG. 5 is a schematic diagram of a structure of the antenna board in FIG. 3.

As shown in FIG. 3 to FIG. 5, a first convex portion 32 upwardly protrudes from the fastener 3, the first convex portion 32 forms a first limiting structure, a second convex portion 23 upwardly protrudes from the upper end face of the antenna board 2, and the second convex portion 23 forms a second limiting structure. In the mounting state, the first convex portion 32 is located between the second convex portion 23 and the limiting protrusions 115. In other words, the second convex portion 23 and the limiting protrusions 115 can tightly clamp the first convex portion 32 respectively from both sides along the length direction. Such arrangement can restrict the first convex portion 32 from moving towards both sides along the length direction. A case that is caused by shaking of the electronic device and the like and in which the fastener 3 slides relative to the limiting protrusions 115 along the length direction of the mounting cavity 11 and is detached from the limiting portion can be avoided in a use process. This can ensure that the fastener 3 can be stably clamped between the limiting portion and the upper end face of the antenna board 2, and further ensure that the fastener 3 has a stable effect on the antenna board 2.

In other words, the first limiting structure is provided on the fastener 3, and the second limiting structure is provided on the antenna board 2. In the mounting state, the two limiting structures cooperate with each other for limiting, to restrict the fastener 3 from moving along the length direction of the mounting cavity 11, thereby ensuring stability of the fastener 3.

Further, as shown in FIG. 4, the fastener 3 includes a fastening plate 31. The fastening plate 31 partially arches upward, and an arched portion forms the first convex portion 32 protruding upward. Certainly, the first convex portion 32 may be formed by partially bending the fastening plate 31 or formed by machining. Alternatively, the fastening plate 31 may be provided as a flat plate structure, and a convex structure may be fastened on an upper end face at one end of the fastening plate 31 that faces the first convex portion 32, to form the first convex portion 32. When the first convex portion 32 is formed by the partial arching, the overall structure can be simplified and an overall weight can be reduced.

In the embodiments of this application, the fastener 3 is a plastic member. The fastener 3 may be integrally injection-molded, may be provided as a metal member, or the like. The integrally injection-molded plastic member can simplify the overall structure and a processing process.

As shown in FIG. 3 and FIG. 4, an end of the first convex portion 32 is further provided with a stopper 33. The stopper 33 is configured to abut against the second convex portion 23. In the mounting state, a lower end of the stopper 33 can abut against the upper end face of the antenna board 2, to avoid a case that a gap exists between the lower end of the stopper 33 and the upper end face of the antenna board 2 and limiting cannot be implemented due to entry of the second convex portion 23 into the gap when the second convex portion 23 abuts against the stopper 33. In addition, an upper end of the stopper 33 is further provided with a limiting block 34. The limiting block 34 is disposed on a side that faces the second convex portion 23. When the second convex portion 23 abuts against the stopper 33, the limiting block 34 can limit an abutment location of the second convex portion 23 from above, so as to limit the second convex portion 23 to between the upper end face of the antenna board 2 and the limiting block 34, thereby ensuring a stable limiting effect.

As shown in FIG. 3 and FIG. 4, the fastener 3 is further provided with an operation portion 6. The operation portion 6 is fastened to the fastener 3, and the operation portion 6 has a long length. During mounting, the operation portion 6 is operated to place the fastener 3 into the mounting cavity 11, and the operation portion 6 is pushed, so that the fastener 3 is inserted between the upper end face of the antenna board 2 and the limiting protrusions 115. The operations are convenient. The operation portion 6 extends out of the mounting cavity 11 due to its long length. In this way, a sufficient space for manual operations is provided. Specifically, the operation portion 6 is detachable from the fastener 3. Therefore, after the mounting is completed, the operation portion 6 may be detached from the fastener 3 and then removed, to avoid impact of the operation portion 6 on subsequent mounting.

Specifically, a manner of connection between the fastener 3 and the operation portion 6 is not limited in the embodiments of this application. For example, the fastener 3 may be detachably connected to the operation portion 6 by using threads or the like, or the fastener 3 and the operation portion 6 may be provided as an integral structure, while connection strength at a connection joint between the fastener 3 and the operation portion 6 is reduced (for example, a cross-sectional area of the connection joint is reduced). After mounting of the fastener 3 is completed, the connection between the operation portion 6 and the fastener 3 may be broken directly in a manner such as rotating or bending the operation portion 6 relative to the fastener 3, and then the operation portion 6 can be removed. The operations are convenient.

As a mounting space is small and a volume of the fastener 3 is also small, operations are inconvenient if a mounting person holds the fastener 3 and inserts the fastener 3 between the upper end face of the antenna board 2 and the limiting protrusions 115 only by hands. In contrast, when the mounting is performed by using the operation portion 6, operations for picking, placing, and mounting the fastener 3 are convenient.

A structure of the second convex portion 23 is not limited. To further prevent the second convex portion 23 from entering the gap between the lower end of the stopper 33 and the upper end face of the antenna board 2, the second convex portion 23 may be a bump fixedly provided on the upper end face of the antenna board 2. The bump may have a specific height, for example, a top end of the bump is substantially corresponding to a location at or above the middle of the stopper 33 and is below the limiting block 34. Alternatively, as shown in FIG. 3 and FIG. 5, the upper end face of the antenna board 2 is further fixedly provided with a baffle plate 24, and the baffle plate 24 is upwardly bent towards one end of the first convex portion 32 to form the second convex portion 23. The second convex portion 23 is a structure tilted on the upper end face of the antenna board 2. The second convex portion 23 has a specific height to ensure that the second convex portion 23 can abut against a middle location of the stopper 33. This further ensures that the second convex portion 23 does not enter the gap between the lower end of the stopper 33 and the upper end face of the antenna board 2, thereby ensuring a stable limiting effect. When the second convex portion 23 is formed by bending the baffle plate 24, the overall structure and a molding process can be further simplified.

The connection and fastening between the bump and the upper end face of the antenna board 2 and between the baffle plate 24 and the upper end face of the antenna board 2 are completed outside the mounting cavity 11. Therefore, the connection and fastening between the bump and the upper end face of the antenna board 2 and between the baffle plate 24 and the upper end face of the antenna board 2 are not limited, for example, the fastening may be implemented by soldering or a fastener.

Figure 6:
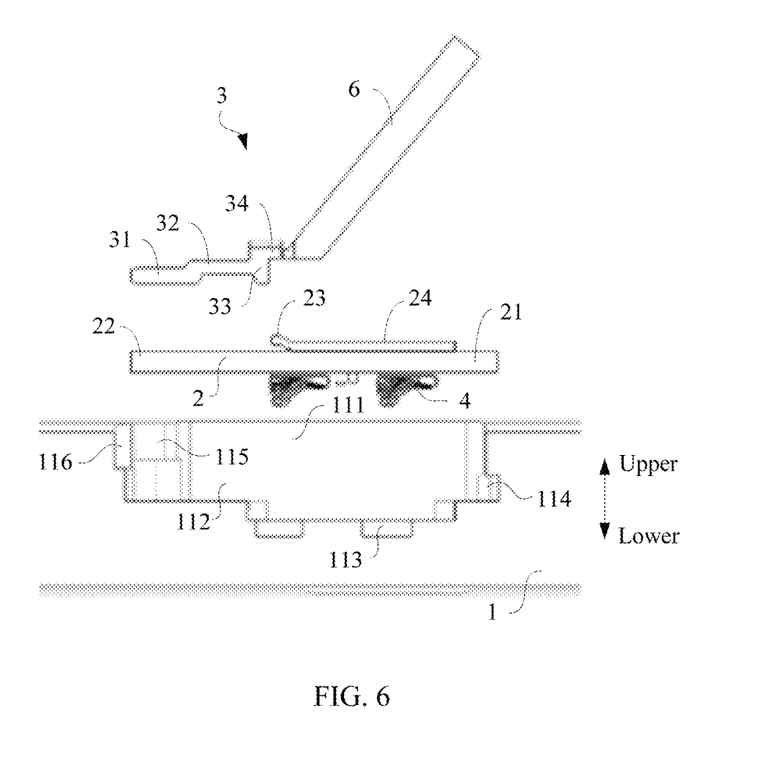
FIG. 6 is a schematic diagram of a structure existing before the mounting.
Figure 7:
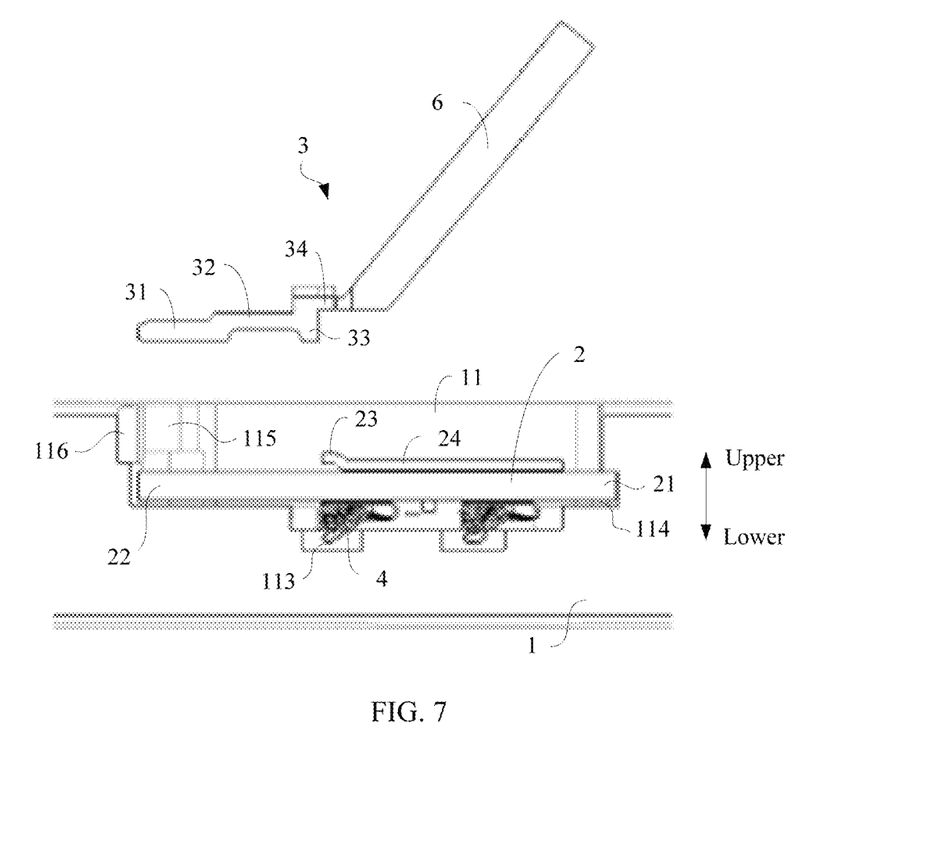
FIG. 7 is a schematic diagram of a structure with the antenna board mounted in a mounting cavity.
Figure 8:
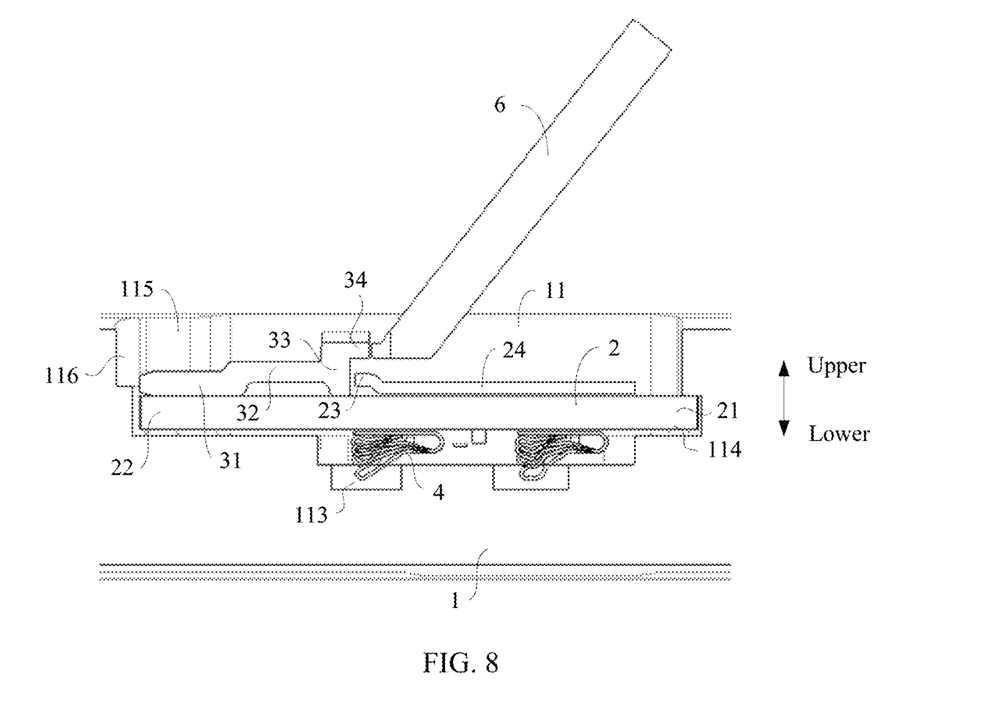
FIG. 8 is a schematic diagram of a structure with the fastener mounted in the mounting cavity.
Figure 9:
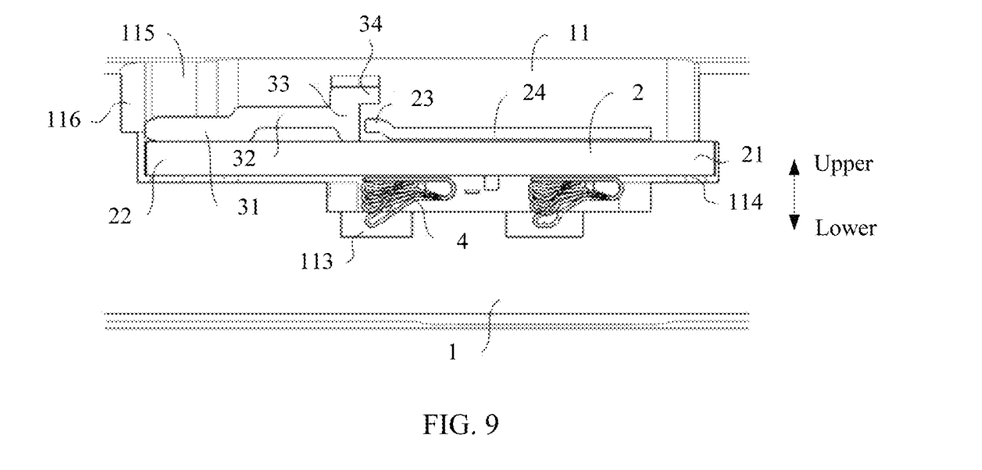
FIG. 9 is a schematic diagram of a structure obtained after the mounting is completed.

A specific mounting process of the antenna board 2 is shown in FIG. 6 to FIG. 9. In FIG. 6, neither the antenna board 2 nor the fastener 3 is mounted. As shown in FIG. 7, the antenna board 2 is first mounted in the middle cavity body 112 of the mounting cavity 11. Then, as shown in FIG. 8, the fastening plate 31 of the fastener 3 is inserted between the upper end face of the antenna board 2 and the limiting protrusions 115 by using the operation portion 6, the first convex portion 32 is located between the second convex portion 23 and the limiting protrusions 115, and a location of the antenna board 2 is stable. Finally, the operation portion 6 is removed. A final product structure is shown in FIG. 9.

Figure 10:
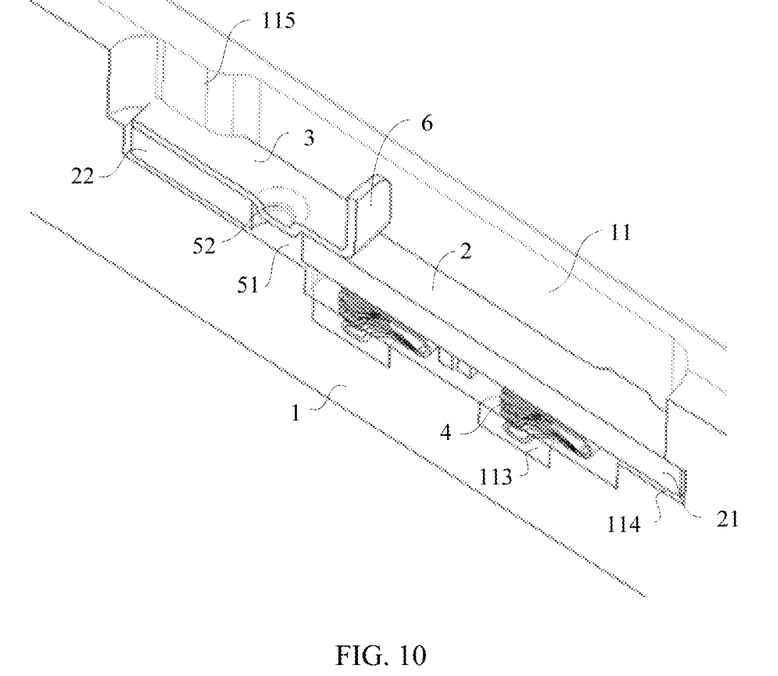
FIG. 10 is a schematic diagram of a structure with an antenna board mounted in a mounting cavity, where an operation portion as a whole is located in the mounting cavity.
Figure 11:
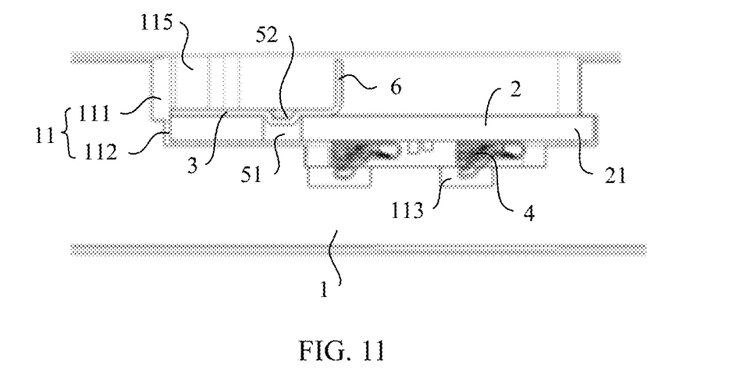
FIG. 11 is a main view of FIG. 10.

In the embodiments of this application, a specific structure of the fastener is not limited. FIG. 10 and FIG. 11 show a fastener 3 in another embodiment. The fastener 3 is provided with a positioning protrusion 52. The positioning protrusion 52 forms the first limiting structure. The antenna board 2 is provided with a positioning hole 51. The positioning hole 51 forms the second limiting structure. After mounting, when the fastener 3 is clamped between the limiting portion and the upper end face of the antenna board 2, the positioning protrusion 52 can be inserted into the positioning hole 51, thereby limiting the fastener 3 and the antenna board 2 along the length direction. Cooperation between the positioning protrusion 52 and the positioning hole 52 is similar to the cooperation between the first convex portion 32 and the second convex portion 23, and detachment between the fastener 3 and the limiting protrusions 115 that is caused by location movement of the fastener 3 can be prevented. When the positioning hole 51 cooperates with the positioning protrusion 52 to implement positioning, the overall structure can be simplified while a stable limiting effect can be ensured.

Specifically, a specific structure of the positioning protrusion 52 is not limited. For example, a protrusion structure may be formed by downwardly stamping the fastener 3, or a protrusion structure may be integrally formed or additionally fastened on a lower end face of the fastener 3. Certainly, in the embodiments of this application, alternatively, the fastener 3 may be provided with a positioning hole 51, and the upper end face of the antenna board 2 may be provided with a positioning protrusion 52. After the fastener 3 is mounted, the positioning protrusion 52 can be inserted into the positioning hole 51 to implement positioning cooperation.

After the positioning protrusion 52 is inserted into the positioning hole 51, a location of the fastener 3 and that of the antenna board 2 are relatively fixed along the length direction. Since the antenna board 2 is mounted in the middle cavity body 112, the antenna board 2 has a stable location along its length direction. Therefore, when the relative locations of the fastener 3 and the antenna board 2 are fixed, it can be ensured that the fastening plate 31 is not detached from the limiting protrusions 115 due to location movement.

The operation portion 6 obtained in the foregoing embodiment has a long length. After the fastener 3 is mounted, the operation portion 6 partially extends out of the mounting cavity 11. The operation portion 6 is detachable from the fastener 3. After the mounting is completed, the operation portion 6 can be removed. FIG. 10 and FIG. 11 show an operation portion 6 in another embodiment. After the fastener 3 is mounted, the operation portion 6 as a whole is located in the mounting cavity 11, and does not extend out of the mounting cavity 11. Therefore, the operation portion 6 does not affect subsequent mounting or use. In other words, the operation portion 6 does not need to be removed after the mounting is completed. Specifically, during mounting, a mounting person may clamp the operation portion 6 by using tweezers, a clamp, or the like, and act on the operation portion 6 from the outside of the mounting cavity 11, so that the fastener 3 is inserted between the antenna board 2 and the limiting protrusions 115. The operations are convenient. Specifically, the operation portion 6 may be formed by bending an end of the fastener 3, or the operation portion 6 may be fastened to the fastener 3 by soldering or the like.

In this specification, principles and implementations of the present invention are described by using specific examples. The descriptions of the foregoing embodiments are merely intended to help understand the method and the core idea of the present invention. It should be noted that, a person of ordinary skill in the art can further make some improvements and modifications to the present invention without departing from the principles of the present invention, and the improvements and modifications shall fall within the protection scope of the present invention.

What is claimed is:

1. An electronic device, comprising a middle frame, an antenna board, and a fastener;
    the middle frame is provided with a mounting cavity, and an inner wall of the mounting cavity is provided with a limiting portion; and
    the antenna board is placed in the mounting cavity, and the fastener is capable of being clamped between the limiting portion and an upper end face of the antenna board, to restrict the antenna board from moving upward along a depth direction of the mounting cavity.

2. The electronic device according to claim 1, wherein the mounting cavity is inwardly provided with a limiting protrusion on each of two sidewalls along a width direction, a spacing between the limiting protrusions disposed on the two sidewalls is less than a width of the fastener, and the limiting protrusions form the limiting portion.

3. The electronic device according to claim 1, wherein the limiting portion is a limiting groove disposed on the inner wall of the mounting cavity, and the fastener is capable of being inserted into the limiting groove and abutting against the upper end face of the antenna board.

4. The electronic device according to claim 1, wherein a slot is further disposed on an inner wall at one end of the mounting cavity along a length direction of the mounting cavity, a first end of the antenna board along a length direction of the antenna board is capable of being inserted into the slot, and an upper sidewall of the slot is capable of restricting the antenna board from moving upward.

5. The electronic device according to claim 4, wherein the mounting cavity comprises an upper cavity body and a middle cavity body from top to bottom; and
    the middle cavity body is provided with the slot, and the upper cavity body outwardly extends away from one end of the slot and forms an avoidance space.

6. The electronic device according to claim 5, wherein a bottom of the middle cavity body is further provided with an accommodating groove, a lower end face of the antenna board is further provided with a metal elastomer for connecting to the middle frame, and when the antenna board is mounted in the middle cavity body, the metal elastomer is located in the accommodating groove.

7. The electronic device according to claim 1, wherein the fastener is provided with a first limiting structure, the antenna board is provided with a second limiting structure, and when the fastener abuts against the upper end face of the antenna board, the first limiting structure and the second limiting structure are capable of cooperating with each other to restrict the fastener from moving and being detached from the limiting portion.

8. The electronic device according to claim 7, wherein the first limiting structure is a first convex portion upwardly protruding from the fastener, the second limiting structure is a second convex portion upwardly protruding from the upper end face of the antenna board, and the first convex portion is located between the second convex portion and the limiting portion.

9. The electronic device according to claim 8, wherein the fastener comprises a fastening plate, and the fastening plate partially arches upward and forms the first convex portion.

10. The electronic device according to claim 9, wherein an end of the first convex portion is further provided with a stopper for abutting against the second convex portion, a bottom of the stopper is capable of abutting against the upper end face of the antenna board, and a limiting block is further disposed on a side that is of an upper portion of the stopper and that faces the second convex portion.

11. The electronic device according to claim 8, wherein the upper end face of the antenna board is fixedly provided with a baffle plate, and the baffle plate is upwardly bent towards one end of the first convex portion and forms the second convex portion.

12. The electronic device according to claim 7, wherein one of the first limiting structure and the second limiting structure is a positioning hole and the other is a positioning protrusion, and when the fastener is clamped between the limiting portion and the upper end face of the antenna board, the positioning protrusion is capable of being inserted into the positioning hole.

13. The electronic device according to claim 1, wherein the fastener is further provided with an operation portion.

14. The electronic device according to claim 13, wherein the operation portion is capable of being detached from the fastener.

15. The electronic device according to claim 13, wherein the operation portion is formed by bending an end of the fastener, and the operation portion is located in the mounting cavity.

* * * * *